United States Patent
Nakajima et al.

(10) Patent No.: US 11,427,512 B2
(45) Date of Patent: Aug. 30, 2022

(54) CUBIC BORON NITRIDE SINTERED BODY AND MANUFACTURING METHOD THEREOF, AND TOOL

(71) Applicant: SHOWA DENKO K.K., Tokyo (JP)

(72) Inventors: Takumi Nakajima, Matsumoto (JP); Jiro Yamada, Matsumoto (JP)

(73) Assignee: SHOWA DENKO K.K., Tokyo (JP)

(*) Notice: Subject to any disclaimer, the term of this patent is extended or adjusted under 35 U.S.C. 154(b) by 0 days.

(21) Appl. No.: 17/420,260

(22) PCT Filed: Jan. 14, 2021

(86) PCT No.: PCT/JP2021/000951
§ 371 (c)(1),
(2) Date: Jul. 1, 2021

(87) PCT Pub. No.: WO2021/192509
PCT Pub. Date: Sep. 30, 2021

(65) Prior Publication Data
US 2022/0055952 A1 Feb. 24, 2022

(30) Foreign Application Priority Data
Mar. 24, 2020 (JP) .............................. JP2020-053229

(51) Int. Cl.
*C04B 35/5831* (2006.01)
*B23B 27/14* (2006.01)
*C04B 35/626* (2006.01)

(52) U.S. Cl.
CPC .......... *C04B 35/5831* (2013.01); *B23B 27/14* (2013.01); *C04B 35/6261* (2013.01);
(Continued)

(58) Field of Classification Search
CPC ............ C04B 35/5831; C04B 35/6261; C04B 35/62675; C04B 35/6268; C04B 2235/3813
See application file for complete search history.

(56) References Cited

U.S. PATENT DOCUMENTS 6,316,094 B1   11/2001  Fukaya et al.
6,635,593 B1 * 10/2003  Kukino ............... C04B 35/5831
                                          501/96.4
(Continued)

FOREIGN PATENT DOCUMENTS

CN   102190497 A   9/2011
CN   104284747 A   1/2015
(Continued)

OTHER PUBLICATIONS

Written Opinion for PCT/JP2021/000951 dated Mar. 9, 2021 (PCT/ISA/237).
(Continued)

*Primary Examiner* — Noah S Wiese
(74) *Attorney, Agent, or Firm* — Sughrue Mion, PLLC

(57) ABSTRACT

There are provided a cubic boron nitride sintered body having a surface also excellent in adhesiveness to a ceramic coating film, while having excellent wear resistance and defect resistance, and a manufacturing method thereof, and a tool. The cubic boron nitride sintered body of the present invention includes 60.0 to 90.0% by volume of cubic boron nitride, the remainder being a binder phase, wherein the binder phase contains: at least any of a nitride, a boride, and an oxide of Al; at least any of a carbide, a nitride, a carbonitride, and a boride of Ti; and a compound represented by the following formula (1):

$$W_2Ni_xCo_{(1-x)}B_2 (0.40 \leq x < 1) \qquad (1).$$

8 Claims, 2 Drawing Sheets

(52) U.S. Cl.
CPC .... *C04B 35/6268* (2013.01); *C04B 35/62675* (2013.01); *B23B 2226/125* (2013.01); *C04B 2235/3813* (2013.01)

(56) References Cited

U.S. PATENT DOCUMENTS

| | | | | |
|---|---|---|---|---|
| 9,327,352 | B2 * | 5/2016 | Fukushima | ......... C04B 35/5831 |
| 2003/0054940 | A1 * | 3/2003 | Abe | ................... C04B 35/5831 |
| | | | | 501/96.4 |
| 2013/0309468 | A1 | 11/2013 | Kudo | |
| 2015/0132076 | A1 | 5/2015 | Miyashita et al. | |
| 2017/0362130 | A1 | 12/2017 | Hirano et al. | |

FOREIGN PATENT DOCUMENTS

| | | |
|---|---|---|
| CN | 104418594 A | 3/2015 |
| CN | 107207362 A | 9/2017 |
| JP | 2000-44350 A | 2/2000 |
| JP | 2002-226273 A | 8/2002 |
| JP | 2004-331456 A | 11/2004 |
| JP | 2006-315898 A | 11/2006 |
| WO | 00/47537 A1 | 8/2000 |
| WO | WO-02081764 A1 * | 10/2002 ............. C22C 1/058 |
| WO | 2006/046125 A1 | 5/2006 |
| WO | 2012/105710 A1 | 8/2012 |
| WO | 2012/144502 A1 | 10/2012 |
| WO | WO-2012144502 A1 * | 10/2012 ........... C04B 37/026 |
| WO | WO-2017179828 A1 * | 10/2017 ......... C04B 35/6261 |

OTHER PUBLICATIONS

Office Action dated Dec. 21, 2021 from the China National Intellectual Property Administration in CN Application No. 202180001763.6.

* cited by examiner

CUBIC BORON NITRIDE SINTERED BODY AND MANUFACTURING METHOD THEREOF, AND TOOL

CROSS REFERENCE TO RELATED APPLICATIONS

This application is a National Stage of International Application No. PCT/JP2021/000951 filed Jan. 14, 2021, claiming priority based on Japanese Patent Application No. 2020-053229 filed Mar. 24, 2020.

TECHNICAL FIELD

The present invention relates to a cubic boron nitride sintered body and a manufacturing method thereof, and a tool for cutting and grinding.

BACKGROUND ART

Cubic boron nitride (hereinafter abbreviated as cBN) is a substance having hardness equivalent to that of diamond, and a cBN sintered body obtained by sintering cBN particles as a main component is a material having both characteristics of wear resistance and defect resistance. Therefore, cBN sintered bodies are mainly utilized for cutting tools for difficult-to-cut materials such as high hardness steel.

In order to meet the need for further enhancement of wear resistance and defect resistance according to the purpose of cutting, various modes of use of cutting tools, and the like, the improvement of cBN sintered bodies is pursued.

For example, PTL 1 states that for metal components W, Co, and Ni present as a compound in a cBN sintered body, setting the ratio of the weight of W to the total weight of W, Co, and Ni in the range of 0.2 to 0.6, and setting the ratio of the weight of Co to the total weight of Co and Ni in the range of 0.6 to 0.95 provide a cBN sintered body excellent in strength and heat resistance.

PTL 2 states that when the ratio of the XRD intensity of the $B_6Co_{21}W_2$ (420) plane to the X-ray diffraction (XRD) intensity of the cBN (111) plane is in the range of 0.10 to 0.40, a cBN sintered body having high cBN content and low specific resistance is obtained.

PTL 3 states that when the XRD peak height of the $TiB_2$ (101) plane is 12% smaller than the XRD peak height of the cBN (111) plane, a decrease in the defect resistance of a cBN sintered body is suppressed.

CITATION LIST

Patent Literature

PTL 1: WO 2000/047537
PTL 2: JP 2004-331456 A
PTL 3: WO 2006/046125

SUMMARY OF INVENTION

Technical Problem

In recent years, the difficulty in cutting work materials meeting weight reduction, and the increase in cutting speed for the reduction of processing cost have been significant, and the performance required of tools of cBN sintered bodies (hereinafter abbreviated as CBN tools) has also been strict. In order to meet such a requirement, for example, CBN tools obtained by covering the surface of a cBN sintered body with a ceramic coating film excellent in heat resistance such as TiN, TiAlN, TiCN, or CrAlN are also used.

However, with the conventional cBN sintered bodies as described in the above PTL 1 to 3, the adhesiveness to a ceramic coating film is not necessarily sufficient. For example, a problem is that during the cutting and grinding of discontinuous portions such as the end surfaces of a gear or pinholes, or high hardness steel having a Rockwell hardness (HRC) of 60 or more, the ceramic coating film peels from the surface of the cBN sintered body, and abnormal wear, chipping, and defects occur from this peeled place.

In addition, when a ceramic coating film is formed by a physical vapor deposition (PVD) method, adhesiveness to a ceramic coating film may not be sufficiently obtained with a conventional cBN sintered body when a high bias voltage is applied.

The present invention has been made in order to solve the problems as described above, and it is an object of the present invention to provide a cBN sintered body having a surface also excellent in adhesiveness to a ceramic coating film, while having excellent wear resistance and defect resistance, and a manufacturing method thereof, and a tool.

Solution to Problem

The present invention is based on the finding that according to a cBN sintered body obtained by increasing cBN content, mixing blended raw materials including a Ni source, and cBN, and sintering the mixture to produce $W_2Ni_xCo_{(1-x)}B_2$ in the binder phase, the peeling of a ceramic coating film covering the surface is suppressed, in addition to excellent wear resistance and defect resistance.

Specifically, the present invention provides the following [1] to [9].

[1] A cubic boron nitride sintered body including 60.0 to 90.0% by volume of cubic boron nitride, the remainder being a binder phase, wherein the binder phase contains: at least any of a nitride, a boride, and an oxide of Al; at least any of a carbide, a nitride, a carbonitride, and a boride of Ti, and a compound represented by the following formula (1):

$$W_2Ni_xCo_{(1-x)}B_2 (0.40 \leq x < 1) \quad (1)$$

[2] The cubic boron nitride sintered body according to the above [1], wherein in an X-ray diffraction spectrum using CuKα as a radiation source, a ratio IA/IB of diffraction peak intensity IA attributed to a (112) plane of the compound represented by the formula (1) to diffraction peak intensity IB attributed to a (111) plane of cubic boron nitride is in a range of 0.330 to 0.750.

[3] The cubic boron nitride sintered body according to the above [1] or [2], including $TiB_2$ as the boride of Ti, wherein in the X-ray diffraction spectrum using CuKα as the radiation source, a ratio IC/IB of diffraction peak intensity IC attributed to a (101) plane of $TiB_2$ to the diffraction peak intensity IB attributed to the (111) plane of cubic boron nitride is in a range of 0.140 to 0.750.

[4] The cubic boron nitride sintered body according to any one of the above [1] to [3], having an electrical resistivity at 25° C. of $1.0 \times 10^{-5}$ to $5.0 \times 10^{-2}$ Ω·cm.

[5] The cubic boron nitride sintered body according to any one of the above [1] to [4], wherein a degree of envelope of perimeter length of cubic boron nitride particles is 0.600 to 0.900.

[6] A manufacturing method of the cubic boron nitride sintered body according to any one of the above [1] to [5], including the steps of mixing and crushing a blend including: blended raw materials including an Al source, a Ti source, a Ni source, a W source, and a Co source; and a cubic boron nitride powder to obtain a raw material mixture; heat-treating the raw material mixture at 500 to 800° C. for degassing to obtain a heat-treated powder; and subjecting the heat-treated powder to pressurization and heating treatment under an inert gas atmosphere at 3.0 GPa or more and 1200 to 1500° C. to obtain a cubic boron nitride sintered body.

[7] A tool including the cubic boron nitride sintered body according to any one of the above [1] to [5] as a constituent material.

[8] The tool according to the above [7], for cutting or grinding.

[9] The tool according to the above [7] or [8], including a ceramic coating film on a surface of the cubic boron nitride sintered body.

Advantageous Effects of Invention

According to the present invention, a cBN sintered body excellent in wear resistance and defect resistance and also excellent in adhesiveness to a ceramic coating film is provided.

Therefore, by using the cBN sintered body of the present invention, the life of a CBN tool can be extended also in the grinding of difficult-to-cut materials, and in turn, the processing cost in the cutting and grinding of discontinuous portions and high hardness steel can be reduced.

DESCRIPTION OF EMBODIMENTS

Figure 1:
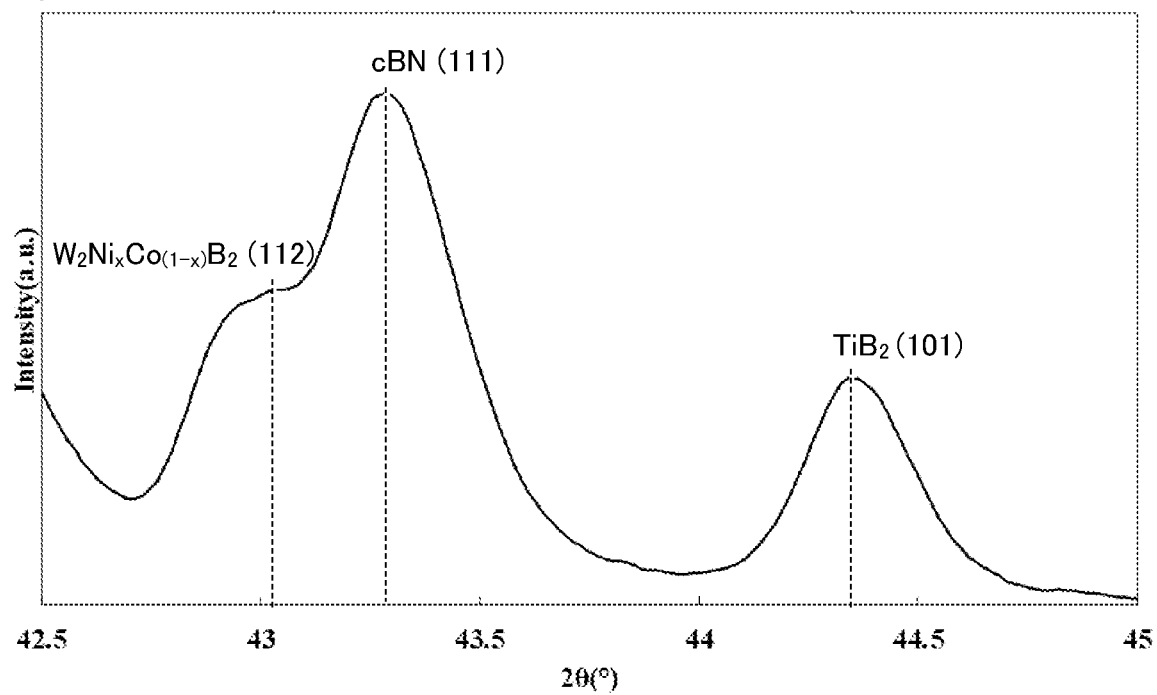
FIG. 1 is an X-ray diffraction (XRD) chart of the cBN sintered body of Example 14.

Embodiments of a cBN sintered body and a manufacturing method thereof, and a tool using a cBN sintered body according to the present invention will be described below.

[cBN Sintered Body]

The cBN sintered body of the present invention includes 60 to 90% by volume of cBN, the remainder being a binder phase. The binder phase contains: at least any of a nitride, a boride, and an oxide of Al; at least any of a carbide, a nitride, a carbonitride, and a boride of Ti; and a compound A represented by the following formula (1):

$$W_2Ni_xCo_{(1-x)}B_2 (0.40 \leq x < 1) \quad (1)$$

Such a cBN sintered body has excellent wear resistance and defect resistance, and good adhesiveness to a ceramic coating film covering the surface is obtained.

<cBN>

The content of cBN in the cBN sintered body of this embodiment is 60.0 to 90.0% by volume, preferably 60.0 to 85.0% by volume, and more preferably 65.0 to 80.0% by volume.

By the content being 60.0% by volume or more, even when minute cracks occur, extension to the interior of the cBN sintered body is suppressed, and good defect resistance is obtained, while excellent characteristics of cBN such as high hardness, high oxidation resistance, and high thermal conductivity are exploited. When the content is 90.0% by volume or less, the aggregation of cBN particles is suppressed, and sintering is easily performed without the cBN particles falling off, and therefore good wear resistance is obtained.

The content of cBN in the cBN sintered body is a value obtained by regarding the proportion of the area occupied by cBN as the volume content based on an observation image of the mirror-polished surface of the cBN sintered body by a scanning electron microscope (SEM). Specifically, the content is obtained by a method described in the following Examples.

The cBN particles in the cBN sintered body of this embodiment preferably have a degree of envelope of perimeter length of 0.600 to 0.900, more preferably 0.700 to 0.880, and further preferably 0.750 to 0.850.

The degree of envelope of perimeter length is a parameter regarding a particle shape, represents the proportion of envelope perimeter length to particle perimeter length, and is an indicator of the degree of unevenness of a particle surface. As the degree of envelope of perimeter length becomes closer to 1, it is meant that the unevenness of the particle surface becomes smaller, and the contour becomes smoother. As the degree of envelope of perimeter length becomes smaller, there is larger unevenness on the particle surface, and the contour tends to be rougher, and the particle tends to be more distorted.

When the degree of envelope of perimeter length of the cBN particles is small, the interfacial strength between the cBN particles and the binder phase is high, and the cBN particles are less likely to fall off, and cracks are less likely to occur in the cBN sintered body. Also, when, for example, a ceramic coating film is formed on the surface of such a cBN sintered body by a PVD method by applying a high bias voltage, the falling off of the cBN particles is less likely to occur, and good adhesiveness to the ceramic coating film is obtained.

When the degree of envelope of perimeter length is 0.600 or more, an excessive reaction between the cBN particles and the constituent raw materials of the binder phase is suppressed, and high hardness and excellent wear resistance that are intrinsic characteristics of the cBN particles are sufficiently exhibited. When the degree of envelope of perimeter length is 0.900 or less, the sintering reaction with the constituent raw materials of the binder phase proceeds moderately without the cBN particles falling off, and thus good wear resistance and defect resistance are shown, and good adhesiveness to a ceramic coating film is obtained.

Figure 3:
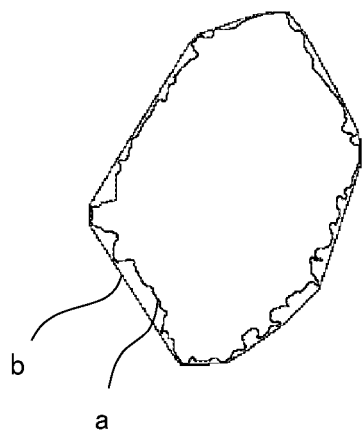
FIG. 3 is a schematic view for explaining the perimeter length and envelope perimeter length of cBN particles in a cBN sintered body.

In the present invention, the degree of envelope of perimeter length of the cBN particles in the cBN sintered body refers to a value obtained by measuring the perimeter length LA and envelope perimeter length LB of 100 cBN particles based on an observation image of the mirror-polished surface of the cBN sintered body by an SEM, calculating LB/LA, and obtaining the arithmetic mean of these. Specifically, as shown in FIG. 3, for example, when the contour of one cBN particle in an observation image by an SEM is a, the total length of the contour a is the perimeter length LA. The perimeter connecting the raised portions of the contour a is b, and the total length of the perimeter b is the envelope perimeter length LB. The degree of envelope of perimeter length is specifically obtained by a method described in the following Examples.

The cBN particles in the cBN sintered body of this embodiment have an average particle diameter of preferably 1.0 to 10.0 μm, more preferably 1.0 to 6.0 μm, and further preferably 2.0 to 5.0 μm. When the average particle diameter is 1.0 μm or more, all cBN particles are easily strongly held by the binder phase. When the average particle diameter is 10.0 μm or less, the sintered body easily becomes excellent in toughness.

The average particle diameter of the cBN particles in the cBN sintered body as referred to herein is the particle diameter at a cumulative area of 50% in the cumulative distribution of the area-equivalent diameters of 100 cBN particles obtained based on an observation image of the mirror-polished surface of the cBN sintered body by an SEM.

<Binder Phase>

The remainder in the cBN sintered body of this embodiment is a binder phase. The binder phase contains; at least any of a nitride of Al, a boride of Al, and an oxide of Al; at least any of a carbide of Ti, a nitride of Ti, a carbonitride of Ti, and a boride of Ti; and a compound A represented by the following formula (1);

$$W_2Ni_xCo_{(1-x)}B_2 (0.40 \leq x < 1) \quad (1)$$

The binder phase has high bonding force to cBN, suppresses the occurrence and extension of cracks in the cBN sintered body, and provides excellent defect resistance.

The compounds constituting the binder phase include TiN, TiCN, $TiB_2$, AN, $Al_2O_3$, and the compound A in a preferred embodiment and further also preferably include $W_2Co_{21}B_6$.

The compounds constituting the binder phase are confirmed by qualitative analysis by an XRD method for the cBN sintered body. The qualitative analysis of the cBN sintered body is specifically performed by checking against an existing inorganic material database as shown in the following Examples.

The compound A plays a role in strongly adhering the binder phase to the cBN particles and promoting the densification of the cBN sintered body. From such a viewpoint, x representing the ratio between Ni and Co in the compound A is $0.40 \leq x<1$, preferably $0.45 \leq x \leq 0.95$, and further preferably $0.50 \leq x \leq 0.90$.

When x is 0.40 or more, a sufficient amount of the compound A to moderately densify the cBN sintered body is produced in the binder phase. When x is less than 1, a high hardness cBN sintered body is easily obtained by the production of the compound A that is a composite compound including Co and Ni in the binder phase.

The compound A can promote reaction sintering in the binder phase and between the binder phase and the cBN particles to increase the interfacial strength between the cBN particles and the binder phase, but, on the other hand, is poorer in hardness than cBN, and the crystals preferably do not grow coarsely, and are preferably not too many from the viewpoints of good wear resistance and defect resistance of the cBN sintered body. Therefore, the compound A is preferably included in an amount ratio within a predetermined range to cBN.

In the present invention, the preferred amount ratio of the compound A to cBN is determined based on diffraction peak intensity in the XRD spectrum of the cBN sintered body. Specifically, in the XRD spectrum using CuKα as a radiation source, the ratio IA/IB of diffraction peak intensity IA attributed to the (112) plane of the compound A to diffraction peak intensity IB attributed to the (111) plane of cBN is preferably in the range of 0.330 to 0.750, more preferably in the range of 0.350 to 0.730, and further preferably in the range of 0.410 to 0.700.

Peak intensity in an XRD spectrum is influenced not only by the amount of a crystal phase produced but also by the crystallinity and orientability of particles in a sintered body, and therefore it should be noted that the diffraction peak intensity ratio in the present invention does not necessarily correspond to the proportion of the composition in the cBN sintered body.

The cBN sintered body preferably includes $TiB_2$ as the boride of Ti, and, like the compound A, the content of $TiB_2$ is also preferably within a predetermined range of the amount ratio to cBN from the viewpoints of the interfacial strength between the cBN particles and the binder phase and the wear resistance of the cBN sintered body.

In the present invention, the preferred amount ratio of $TiB_2$ to cBN is determined based on diffraction peak intensity in the XRD spectrum for the cBN sintered body. Specifically, in the XRD spectrum using CuKα as the radiation source, the ratio IC/IB of diffraction peak intensity IC attributed to the (101) plane of $TiB_2$ to the diffraction peak intensity IB attributed to the (111) plane of cBN is preferably in the range of 0.140 to 0.750, more preferably in the range of 0.200 to 0.750, and further preferably in the range of 0.250 to 0.700.

However, the X-ray diffraction patterns of $TiB_2$ and $AlB_2$ overlap, and therefore the distinction between both compounds is difficult. In the present invention, for convenience, even when the diffraction peaks overlap for both compounds, they are regarded as the diffraction peak attributed to the (101) plane of $TiB_2$.

Other compounds other than the Al compounds, the Ti compounds, and the compound A as described above may be included in the binder phase. For example, composite oxides of Al and Ti, borides of group 4 to 6 transition metal elements ($ZrB_2$, $ZrB_{12}$, $HfB_2$, HfB, $HfB_{12}$, $VB_2$, $V_3B_4$, $V_3B_{12}$, VB, $V_5B_6$, $V_2B_2$, $NbB_2$, $Nb_3B_2$, NbB, $TaB_2$, $Ta_2B$, $Ta_3B_2$, TaB, $Ta_3B_4$, CrB, $CrB_2$, $Cr_2B$, $Cr_2B_3$, $Cr_5B_3$, $CrB_2$, MoB, $Mo_2B_5$, $MoB_4$, $Mo_2B$, $MoB_2$, WB, $W_2B$, and $WB_4$), nitrides of group 4 to 6 transition metal elements ($ZrN_x$ (0<x≤1), $Hf_3N_2$, $HfN_x$ (0<x≤1), $Hf_4N_3$, $VN_x$ (0<x≤1), $V_2N$, NbN, $Nb_4N_3$, $Nb_2N$, $TaN_x$ (0<x≤1), $Ta_3N_5$, $Ta_4N$, $Ta_2N$, $Cr_2N$, $CrN_x$ (0<x≤1), WN, and $W_2N$), and mutual solid solutions of compounds including the above-described compounds may be included. However, the content of each of group 4 to 6 transition metal elements other than Ti and W in the cBN sintered body is preferably as low as possible, more preferably 1000 ppm by mass or less, and further preferably 100 ppm by mass or less.

Unavoidable impurities, for example, derived from blended raw materials or mixed in the production process such as contamination from a crushing container may be included. Examples of the unavoidable impurities include Li, Mg, Ca, Al, Si, Ti, C, B, S, P, Ga, Co, Ni, Mn, Fe, Cl, W, and compounds thereof, and those overlapping the other compounds can also be included.

<Electrical Resistivity>

The cBN sintered body of this embodiment preferably has an electrical resistivity at 25° C. of $1.0 \times 10^{-5}$ to $5.0 \times 10^{-2}$ Ω·cm, more preferably $1.0 \times 10^{-5}$ to $1.0 \times 10^{-2}$ Ω·cm.

The electrical resistivity of the cBN sintered body within the above range is preferable, for example, in obtaining good adhesiveness to a ceramic coating film also when covering the surface of the cBN sintered body with the ceramic coating film by a physical vapor deposition (PVD) method by applying a high bias voltage.

The electrical resistivity of the cBN sintered body as referred to in the present invention is specifically a value measured by a four-probe method for a measurement sample made as shown in the following Examples.

<Vickers Hardness>

The cBN sintered body of the present invention preferably has high hardness from the viewpoint that it can be preferably used for the cutting of high hardness steel, and the like as a CBN tool. Specifically, the cBN sintered body preferably has a Vickers hardness of 2950 or more, more preferably 3000 or more, and further preferably 3100 or more as measured by a method according to JIS Z 2244: 2009 under the conditions of a load of 9.8 N and a holding time of 15 seconds.

[Manufacturing Method of cBN Sintered Body]

The cBN sintered body of this embodiment can be produced through the step (1) of mixing and crushing a blend including: blended raw materials including an Al source, a Ti source, a Ni source, a W source, and a Co source; and a cBN powder to obtain a raw material mixture; the step (2) of heat-treating the raw material mixture at 500 to 800° C. for degassing to obtain a heat-treated powder; and the step (3) of subjecting the heat-treated powder to pressurization and heating treatment under an inert gas atmosphere at 3.0 GPa or more and 1200 to 1500° C. to obtain a cBN sintered body.

According to the manufacturing method including the steps (1) to (3), the cBN sintered body of this embodiment can be preferably obtained.

<Step (1)>

In the step (1), first, a blend including: blended raw materials including an Al source, a Ti source, a Ni source, a W source, and a Co source; and a cBN powder is mixed and crushed to obtain a raw material mixture.

For the cBN powder, for example, one obtained by finely crushing cBN particles having a purity of 99.9% or more obtained by ultra-high pressure and high temperature synthesis at 3 GPa or more and 1200° C. or more, and adjusting the particle diameter and the particle shape is preferably used.

As the fine crushing means, for example, crushing machines for jaw crusher crushing, jet mill crushing, roll breaker crushing, vibration mill crushing, ball mill crushing, pot mill crushing, planetary ball mill crushing, bead mill crushing, and the like can be used.

In the cBN powder, the particle diameter at a cumulative volume of 50% (hereinafter described as D50) in the volume distribution of particle diameters measured by a laser diffraction scattering method is preferably 0.3 to 10.0 µm, more preferably 1.0 to 8.0 µm, and further preferably 2.0 to 5.0 µm.

When the D50 is 0.3 µm or more, forming a constituent of the binder phase is suppressed, and a sintered body having high hardness containing a sufficient amount of cBN is easily obtained. When the D50 is 10.0 µm or less, a sintered body excellent in toughness and excellent in defect resistance is easily obtained.

For the particle shape of the cBN powder, the degree of circularity is preferably 0.910 to 0.950, more preferably 0.920 to 0.950, and further preferably 0.925 to 0.945.

When the degree of circularity is 0.910 or more, the fluidity of the raw material mixture is good, and the reaction at the interface between the cBN powder and the binder phase proceeds moderately, and a uniform sintered body is easily obtained. When the degree of circularity is 0.950 or less, a moderate contact state between the cBN powder and the binder phase is ensured, and the sintering reaction proceeds well easily.

In the cBN powder, the volume occupied by particles having a degree of circularity of 0.900 or less is preferably 25.0% by volume or less, more preferably 5.0 to 20.0% by volume, and further preferably 10.0 to 18.0% by volume from the viewpoint of the uniform progress of the sintering reaction when obtaining the cBN sintered body.

The degree of circularity is an indicator showing how close a particle is to a sphere, and is based on the definition in JIS Z 8890: 2017. When S is projected area, and L is perimeter length in a two-dimensional image of a particle, the degree of circularity is represented by $4\pi S/L^2$. As the shape in the two-dimensional image becomes closer to a circle, the value of the degree of circularity approaches 1. The degree of circularity of the cBN powder as referred to herein is the arithmetic mean value of the degrees of circularity for about 1000 particles of the cBN powder. Specifically, the degree of circularity of the cBN powder can be measured by a flow type particle image analysis apparatus as shown in the following Examples.

The Al source, the Ti source, the Ni source, the W source, and the Co source constitute part of the binder phase of the cBN sintered body and may each be an element simple substance or a compound.

Preferably, those that produce TiN, TiCN, $TiB_2$, AN, $Al_2O_3$, and the compound A in the binder phase by sintering when obtaining the cBN sintered body are used.

As the blended raw materials, for example, a combination of TiN, $TiAl_3$, WC, Co, Ni, and B can be used.

For the raw material powders used for the blended raw materials, from the viewpoint of the uniformization of the composition of the cBN sintered body, those having a particle diameter approximately equivalent to or less than that of the cBN powder are preferably used, and more preferably D50 is 5.0 µm or less, and further preferably D50 is 0.01 to 3.0 µm.

Group 4 to 6 transition metal elements other than Ti and W, and other unavoidable impurities may be included in the blended raw materials due to derivation from the raw materials of the raw material powders, mixing in the production process, or the like.

When, for example, a combination of TiN, $TiAl_3$, WC, Co, Ni, and B is used as the blended raw materials, and blended with the cBN powder, the amount of the cBN powder blended in 100% by mass of the total of these blended components is preferably 65.00 to 97.00% by mass, more preferably 67.00 to 95.00% by mass, and further preferably 70.00 to 92.00% by mass in order to obtain the cBN sintered body.

When such blended raw materials are used, it is more preferable that in the blended raw materials, the amount of TiN blended be larger than the total amount of $TiAl_3$, WC, Co, and B blended, from the viewpoints of Vickers hardness enhancement, acid resistance, and the like.

In such blended raw materials, the amount of WC blended in 100% by mass of the total of the blended components is preferably 1.00 to 5.00% by mass, more preferably 1.00 to 3.00% by mass, and further preferably 1.50% by mass or more and less than 3.0% by mass from the viewpoint of the ease of producing the compound A.

Similarly, the amount of Co blended is preferably 0.10 to 5.00% by mass, more preferably 0.15 to 2.00% by mass, and further preferably 0.20 to 0.50% by mass. The amount of Ni blended is preferably 0.10 to 15.00% by mass, more preferably 0.15 to 12.00% by mass, and further preferably 0.20 to 10.00% by mass. The amount of B blended is preferably 0 to 10.00% by mass, more preferably 0 to 7.00% by mass, and further preferably 0 to 5.00% by mass.

The raw material mixture obtained by mixing and crushing the blend including the blended raw materials and the cBN powder may be one obtained by dry-crushing the blended raw materials and the cBN powder. From the viewpoint of the uniformization of mixing, the raw material mixture is preferably one obtained by drying a mixed slurry prepared by wet crushing using a dispersion medium. In this case, for example, mixing and crushing can be performed by a planetary ball mill using acetone, hexane, 2-propanol, ethanol, heptane, or the like as the dispersion medium, and balls made of cemented carbide are preferably used because cBN has high hardness. Examples of the method for drying the mixed slurry include stationary drying, reduced pressure drying, and vacuum drying under an inert gas atmosphere such as an inert gas such as Ar, $N_2$ gas, or $H_2$/Ar mixed gas. In the case of the stationary drying, it is preferably performed at a temperature of 70 to 100° C. for 5 hours or more for sufficient drying.

<Step (2)>

In the step (2), the sufficiently dried raw material mixture obtained in the step (1) is heat-treated at a temperature of 500 to 800° C. for degassing to obtain a heat-treated powder.

The heat treatment is preferably performed under a vacuum atmosphere, more preferably at a pressure of $1.0 \times 10^{-3}$ Pa or less, from the viewpoint of efficiently performing degassing treatment.

Degassing treatment before firing in a process for producing a cBN sintered body is usually performed at 1000° C. or more, but in the present invention, the temperature of the heat treatment is 800° C. or less from the viewpoints of the uniform progress of the reaction sintering of the binder phase, and the densification of the sintered body.

From the viewpoints of sufficiently removing impurity components such as organic matter and densifying the sintered body, the temperature of the heat treatment is 500° C. or more.

The temperature of the heat treatment for degassing is more preferably 550 to 750° C., further preferably 600 to 700° C.

The time of the heat treatment is appropriately set according to the amount of the raw material mixture to be treated, the type of the dispersion medium used in the step (1), and the like but is usually preferably 0.1 to 10 hours, more preferably 1 to 3 hours.

<Step (3)>

In the step (3), the heat-treated powder obtained in the step (2) is subjected to pressurization and heating treatment under an inert gas atmosphere at a pressure of 3.0 GPa or more and a temperature of 1200 to 1500° C. to obtain a cBN sintered body.

By firing the heat-treated powder at ultra-high pressure and high temperature in this manner, the cBN sintered body of this embodiment can be preferably obtained.

From the viewpoint of the densification of the cBN sintered body, the highest pressure in the pressurization and heating treatment is preferably 3.5 GPa or more, more preferably 4.0 GPa or more. From the same viewpoint, the highest temperature in the pressurization and heating treatment is preferably 1250 to 1500° C., more preferably 1300° C. to 1500° C.

From the viewpoint of producing the desired cBN sintered body without the heat-treated powder oxidizing during the pressurization and heating treatment, the atmosphere during the handling of the heat-treated powder and during the pressurization and heating treatment is preferably an inert gas atmosphere. Examples of the inert gas include Ar gas and $N_2$ gas. One of these gases may be used alone, or two or more of these gases may be used in combination.

[Tool]

The tool of this embodiment includes the cBN sintered body of the present invention as a constituent material.

As described above, the cBN sintered body of the present invention has high hardness and has excellent wear resistance and defect resistance, and therefore is a preferred material for tools, particularly tools for cutting and grinding. In other words, the cBN sintered body of the present invention can exhibit excellent characteristics as described above, as a CBN tool.

Also, in a CBN tool (coated tool) obtained by covering the surface of a cBN sintered body with a ceramic coating film excellent in heat resistance in order to provide excellent wear resistance and defect resistance in the grinding and cutting of difficult-to-cut materials such as high hardness steel, the cBN sintered body of the present invention has a surface excellent in adhesiveness to the ceramic coating film, and the film can be less likely to peel.

Therefore, also when the cBN sintered body of the present invention is applied to the cutting and grinding of discontinuous portions such as the end surfaces of a gear of high hardness steel and pinholes in high hardness steel, the ceramic coating film is less likely to peel, and the life of the coated tool can also be extended.

Examples of the material of the ceramic coating film include TiN, TiAlN, TiCN, and CrAlN. Among these, TiAlN and CrAlN are preferable from the viewpoints of oxidation resistance and the like, and TiAlN is preferable in terms of cost and the like.

EXAMPLES

The embodiments of the present invention will be described below based on Examples, but the present invention is not limited to the following Examples.

[Production of cBN Sintered Bodies]

<Preparation of cBN Powder Raw Materials> cBN particles ("BN-V", manufactured by Showa Denko K.K.) were finely crushed, and classified by a centrifugation method and a sedimentation method to prepare the cBN (1) to (3) shown below, and they were used as cBN powder raw materials in the production of cBN sintered bodies in the following Examples and Comparative Examples.

cBN (1): D50: 2.8 μm, degree of circularity: 0.943, proportion of number of particles having degree of circularity (one particle) of 0.900 or less: 15.2% cBN (2): D50: 3.6 μm, degree of circularity: 0.936, proportion of number of particles having degree of circularity (one particle) of 0.900 or less: 16.1% cBN (3): D50: 3.1 μm, degree of circularity: 0.928, proportion of number of particles having degree of circularity (one particle) of 0.900 or less: 16.3%

The D50 of the cBN (1) to (3), and other raw material powders used in the production of cBN sintered bodies was obtained from particle size distributions measured by a particle size analysis and measurement apparatus ("Microtrac (registered trademark) MT3300", manufactured by NIKKISO CO., LTD.).

The degrees of circularity of the cBN (1) to (3) were measured by the image analysis of about 1000 (1000 or more) particles using a flow type particle image analysis apparatus ("FPIA-3000", manufactured by SYSMEX CORPORATION).

The proportion of the number of particles having a degree of circularity (one particle) of 0.900 or less is the proportion of the cumulative number of particles at a degree of circularity of 0.900 in a graph of the distribution of the degrees of circularity in which for the about 1000 particles whose degrees of circularity are measured by the image analysis, the degrees of circularity of the particles are represented as the horizontal axis, and the cumulative numbers of particles are represented as the vertical axis.

Examples 1 to 15 and Comparative Examples 1, 2, and 5 to 8

A predetermined cBN powder raw material, a blended raw material (1) prepared by previously mixing TiN (D50 1.2 µm) and TiAl$_3$ (D50 19.8 µm) in a mass ratio of 3:1, and other blended raw materials (WC (D50: 0.5 µm), Co (D50: 2.8 µm), Ni (D50: 0.4 µm), and B (D50: 0.4 µm)) other than the blended raw material (1) were blended with each blending composition shown in the following Table 1, and uniformly mixed and crushed by a planetary ball mill (balls made of cemented carbide (main constituents: WC about 90% by mass, Co about 10% by mass)) using acetone as a dispersion medium, to obtain a slurry of a raw material mixture.

The slurry was subjected to stationary drying under a N$_2$ gas atmosphere at 70° C. for 5 hours and then heat-treated under a vacuum atmosphere at $1.0 \times 10^{-3}$ Pa or less at 650° C. for 0.5 hours for degassing to obtain a heat-treated powder.

Under a N$_2$ gas atmosphere, the heat-treated powder was laminated on a supporting plate made of cemented carbide and then subjected to pressurization and heating treatment at 4.5 GPa and 1500° C. for 1 hour to make a cBN sintered body (diameter about 60 mm, thickness about 4 mm). The upper surface (the surface in contact with the supporting plate made of cemented carbide was the lower surface) of the cBN sintered body was ground with a #400 diamond whetstone to provide a sintered body sample for evaluation.

Comparative Examples 3 and 9

A heat-treated powder was obtained, then a cBN sintered body was obtained, and each sintered body sample was made, in the same manner as Example 1 except that the blending composition of the raw material mixture was as shown in the following Table 1, and the heat treatment temperature during the degassing after the slurry of the raw material mixture was dried was 1000° C.

Comparative Example 4

In Comparative Example 2, heat treatment was not performed during the degassing after the slurry of the raw material mixture was dried, and the dry powder was subjected to pressurization and heating treatment in the same manner as Comparative Example 2, but a flat plate-like cBN sintered body could not be obtained.

[Evaluation and Measurement of cBN Sintered Bodies]

For the sintered body samples obtained in the Examples and Comparative Examples, the following various evaluations and measurements were performed. The evaluation and measurement results of these are collectively shown in Table 1. Evaluation and measurement results for a commercial cBN sintered body (a cBN powder having an average particle diameter of 3 µm (nominal value) and a TiN binder are used) as Comparative Example 10 are shown together.

<cBN Content>

A sintered body sample was mirror-polished, and a reflection electron image was taken at 2000× magnification by an SEM ("S-5500", manufactured by Hitachi High-Technologies Corporation). There were black portions, white portions, and gray portions in the taken image. When the portions were subjected to energy dispersive X-ray spectroscopic analysis (EDX), it was confirmed that the black portions represent cBN, and the white portions and the gray portions represent the binder phase. The taken image was binarized by image processing software, and black portions representing cBN particles and white portions representing the binder phase were confirmed. The proportion of the area of the black portions in the entire region of the field of view of the binarized image was obtained, and the arithmetic mean value for three fields of view was regarded as the proportion of the volume of the cBN particles.

Figure 4A:
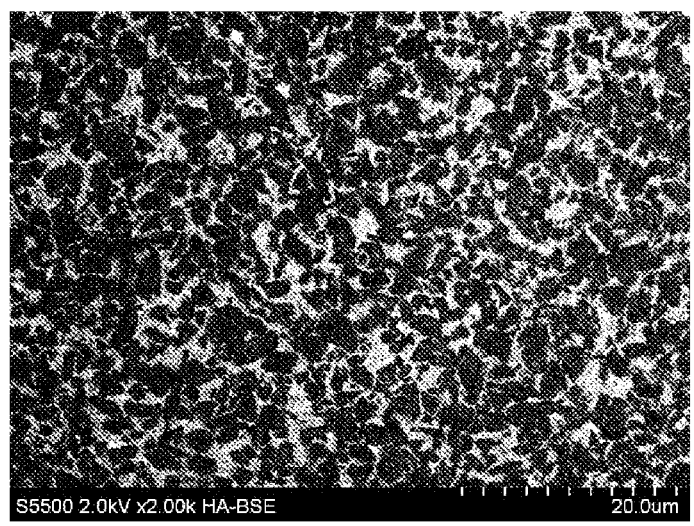
FIG. 4A is an image (magnification 2000×) of the sintered body sample of Example 1 taken by a scanning electron microscope (SEM).
Figure 4B:
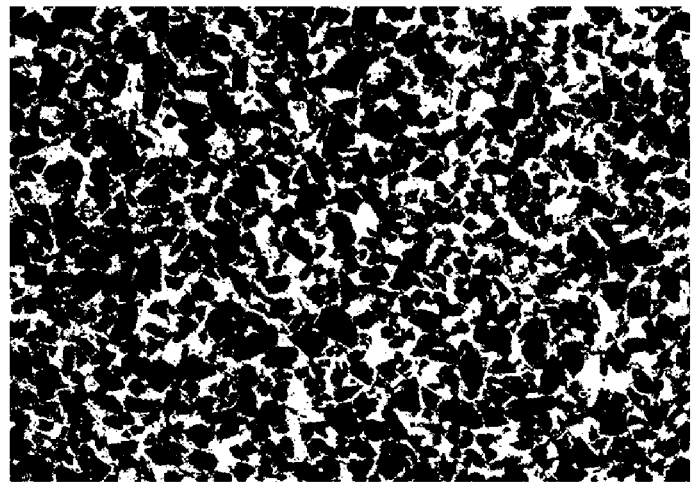
FIG. 4B is a binarized image of the SEM image of FIG. 4A.

For the sintered body sample of Example 1 as a typical example, the image taken by the SEM is shown in FIG. 4A, and its binarized image is shown in FIG. 4B. The size of one field of view is 64.0 µm wide and 44.6 µm long, and the total area of three fields of view is 8563.2 µm$^2$.

<Degree of Envelope of Perimeter Length>

In an image obtained by taking a reflection electron image at 10000× magnification and binarizing the taken image by the same method as the measurement of the <cBN Content>, the perimeter length LA and envelope perimeter length LB of black portions in any 100 places (100 cBN particles) were measured, and LB/LA was calculated. Their arithmetic mean value was taken as the degree of envelope of perimeter length.

<Sintered Body Composition>

XRD measurement was performed by an X-ray diffraction apparatus ("X'pert PRO", manufactured by PANalytical). The measurement was performed under the conditions of CuKα rays, an output voltage of 40 kV, an output current of 40 mA, a sampling width of 0.0167°, a scan speed of 0.4178°/s, and a measurement range of 2 0=10 to 80°.

The measured XRD pattern was checked against an inorganic material database (software "X'pert High Score Plus" was used).

The sintered body composition was identified based on the XRD analysis results, also referring to the results of elemental analysis by inductively coupled plasma-atomic emission spectroscopy (ICP-AES).

The sintered body composition shown in the following Table 1 is components detected by the XRD analysis. It was confirmed that for the sintered body samples of all the Examples and the Comparative Examples (except Comparative Example 4), cBN, TiN, TiCN, TiB$_2$, AN, and Al$_2$O$_3$ were included in sintered body composition. The confirmed components other than these are as described in Table 1.

For the compound A, the amount of Ni and the amount of Co were obtained from the amount of peak shift and lattice constants in the XRD pattern, and the results of elemental analysis by ICP-AES to specify the value of x.

<Peak Intensity Ratio>

In the XRD pattern in the <Sintered Body Composition> section, the diffraction peak intensity IA of the (112) plane of $W_2Ni_xCo_{(1-x)}B_2$ (compound A) around $2\theta=43.00°$, the diffraction peak intensity IB of the cBN (111) plane around $2\theta=43.30°$, and the diffraction peak intensity IC of the $TiB_2$ (101) plane around $2\theta=44.36°$ were measured, and the IA/IB and IC/IB ratios were calculated.

Figure 2:
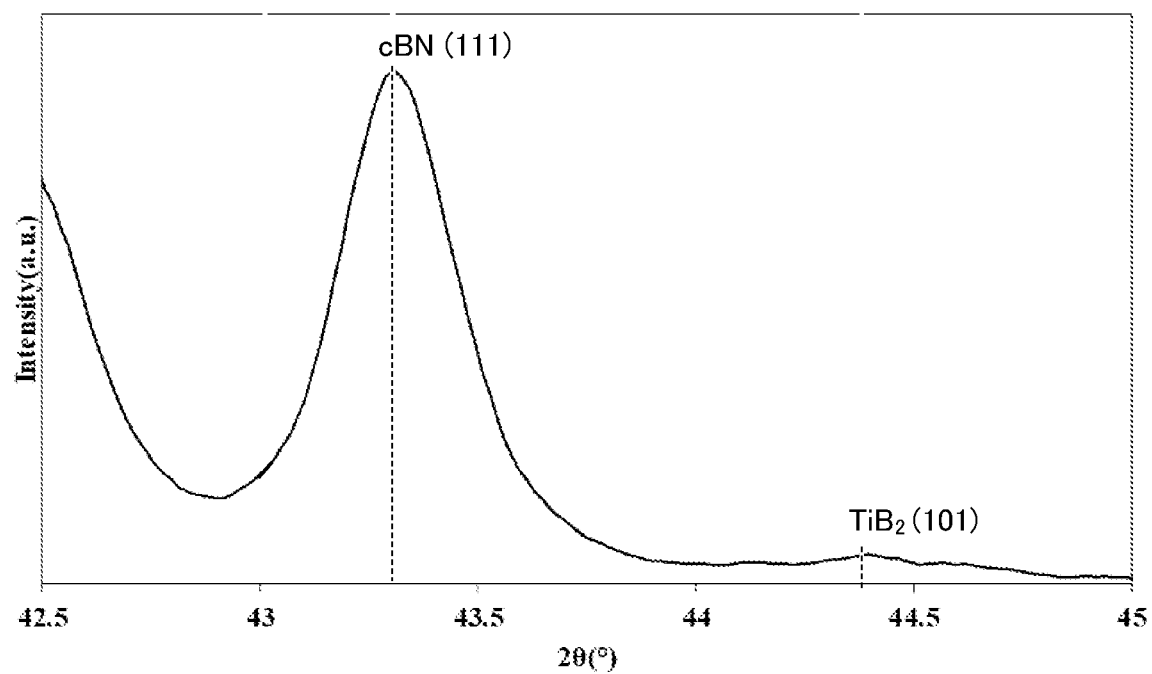
FIG. 2 is an XRD chart of the cBN sintered body of Comparative Example 10.

For Example 14 and Comparative Example 10 as typical examples, enlarged views of $2\theta=42.5°$ to $45.0°$ in the measured XRD patterns are shown in FIG. 1 and FIG. 2 respectively.

<Vickers Hardness>

For a mirror-polished sintered body sample, Vickers hardness was measured by a method according to JIS Z 2244: 2009 under the conditions of a load of 9.8 N and a holding time of 15 seconds.

<Electrical Resistivity>

A piece was cut to 35 mm×20 mm from a sintered body for evaluation by an electrical discharge machine, further removed on the surface side in contact with the supporting substrate made of cemented carbide (lower surface side) by a thickness of 100 μm or more, and then polished to make a measurement sample (35 mm×20 mm, thickness 0.80 mm, surface roughness Rz 0.4 or less).

For the measurement sample, the electrical resistance value was measured by a resistivity meter ("Loresta-GX", manufactured by Mitsubishi Chemical Analytech Co., Ltd.; PSP probe) at room temperature (25° C.) by a four-probe method.

<Cutting Evaluation>

The cutting tool in the ISO standard CNGA120408 was made from a sintered body for evaluation, and a TiAlN coating film was formed by a PVD method to make a coated cutting tool. The film thickness of the film was measured by cross-sectional observation by an SEM.

A work material shown in the following (Test 1) or (Test 2) was subjected to outer periphery turning (cutting speed 150 m/min, amount of cutting 0.20 mm, feed 0.10 mm/rev) using this coated cutting tool. The tool cutting edge after the processing was observed by a digital microscope ("VHX-5500", manufactured by KEYENCE CORPORATION), and the damage state (the presence or absence of film peeling and defects) was confirmed. The maximum wear width of the tool flank was measured, and this was taken as the amount of flank wear (see JIS B 0170: 1993).

(Test 1)

As the work material, one in which a total of 24 pinholes having a diameter of 5 mm and a depth of 10 mm, 3 pinholes at equal intervals in the circumferential direction and 8 pinholes at equal intervals in the longitudinal direction, were formed on the peripheral surface of a round bar of high carbon chromium bearing steel (JIS standard SUJ2; hardness (HRC) 60 to 64) having a diameter of 45 mm and a length of 200 mm was used, and the processing time was 10 minutes.

(Test 2)

As the work material, a round bar of cold die alloy tool steel (JIS standard SKD11; hardness HRC 60 to 64) having a diameter of 70 mm and a length of 300 mm was used, and the processing time was 15 minutes.

(Test 2) was performed only for Examples 11 to 15 and Comparative Examples 6 to 10.

TABLE 1

| | | | | | | | | | | Heat treatment temperature during degassing [° C.] | cBN | | Sintered body | | |
|---|---|---|---|---|---|---|---|---|---|---|---|---|---|---|---|
| | | | | | | | | | | | | | XRD analysis | | |
| | | | Blending composition [% by mass] | | | | | | | | Content [% by volume] | Degree of envelope of perimeter length | composition (Components other than cBN, TiN, TiCN, $TiB_2$, AlN, and $Al_2O_3$) | Peak intensity ratio | |
| | | | cBN | TiN | $TiAl_3$ | WC | Co | Ni | B | | | | | IA/IB | IC/IB |
| Example | 1 | (1) | 74.85 | 16.50 | 5.50 | 2.50 | 0.35 | 0.30 | 0 | 650 | 71.0 | 0.774 | $W_2Ni_{0.46}Co_{0.54}B_2$ | 0.339 | 0.286 |
| | 2 | (1) | 74.65 | 16.50 | 5.50 | 2.50 | 0.35 | 0.50 | 0 | 650 | 70.8 | 0.751 | $W_2Ni_{0.59}Co_{0.41}B_2$ | 0.592 | 0.342 |
| | 3 | (1) | 75.15 | 15.75 | 5.25 | 2.50 | 0.35 | 1.00 | 0 | 650 | 70.4 | 0.720 | $W_2Ni_{0.74}Co_{0.26}B_2$ | 0.636 | 0.368 |
| | 4 | (1) | 74.15 | 13.50 | 4.50 | 2.50 | 0.35 | 5.00 | 0 | 650 | 72.3 | 0.796 | $W_2Ni_{0.95}Co_{0.05}B_2$, $W_2Co_{21}B_6$ | 0.643 | 0.408 |
| | 5 | (1) | 75.15 | 9.00 | 3.00 | 2.50 | 0.35 | 10.00 | 0 | 650 | 71.4 | 0.795 | $W_2Ni_{0.95}Co_{0.05}B_2$, $W_2Co_{21}B_6$ | 0.735 | 0.423 |
| | 6 | (1) | 70.85 | 19.50 | 6.50 | 2.50 | 0.35 | 0.30 | 0 | 650 | 65.2 | 0.745 | $W_2Ni_{0.46}Co_{0.54}B_2$ | 0.413 | 0.340 |
| | 7 | (2) | 80.85 | 12.00 | 4.00 | 2.50 | 0.35 | 0.30 | 0 | 650 | 78.2 | 0.745 | $W_2Ni_{0.46}Co_{0.54}B_2$ | 0.384 | 0.174 |
| | 8 | (2) | 83.85 | 9.75 | 3.25 | 2.50 | 0.35 | 0.30 | 0 | 650 | 81.9 | 0.874 | $W_2Ni_{0.46}Co_{0.54}B_2$ | 0.394 | 0.151 |
| | 9 | (2) | 86.85 | 7.50 | 2.50 | 2.50 | 0.35 | 0.30 | 0 | 650 | 84.4 | 0.834 | $W_2Ni_{0.46}Co_{0.54}B_2$ | 0.399 | 0.149 |
| | 10 | (2) | 90.85 | 4.50 | 1.50 | 2.50 | 0.35 | 0.30 | 0 | 650 | 88.1 | 0.871 | $W_2Ni_{0.46}Co_{0.54}B_2$ | 0.402 | 0.146 |
| | 11 | (3) | 75.75 | 15.75 | 5.25 | 2.00 | 0.25 | 0.50 | 0.50 | 650 | 70.5 | 0.772 | $W_2Ni_{0.67}Co_{0.33}B_2$ | 0.645 | 0.468 |
| | 12 | (3) | 75.25 | 15.75 | 5.25 | 2.00 | 0.25 | 0.50 | 1.00 | 650 | 70.4 | 0.750 | $W_2Ni_{0.67}Co_{0.33}B_2$ | 0.658 | 0.523 |
| | 13 | (3) | 75.25 | 15.75 | 5.25 | 2.00 | 0.25 | 1.00 | 0.50 | 650 | 71.1 | 0.814 | $W_2Ni_{0.80}Co_{0.20}B_2$ | 0.580 | 0.443 |
| | 14 | (3) | 75.75 | 15.00 | 5.00 | 2.00 | 0.25 | 1.00 | 1.00 | 650 | 70.1 | 0.798 | $W_2Ni_{0.80}Co_{0.20}B_2$ | 0.613 | 0.444 |
| | 15 | (3) | 71.75 | 13.50 | 4.50 | 2.00 | 0.25 | 5.00 | 3.00 | 650 | 70.4 | 0.834 | $W_2Ni_{i0.95}Co_{0.05}B_2$, $W_2Co_{21}B_6$ | 0.504 | 0.721 |
| Comparative Example | 1 | (1) | 65.15 | 24.00 | 8.00 | 2.50 | 0.35 | 0 | 0 | 650 | 64.3 | 0.939 | W, WB, $W_2B$ | — | 0.382 |
| | 2 | (1) | 75.15 | 16.50 | 5.50 | 2.50 | 0.35 | 0 | 0 | 650 | 70.4 | 0.785 | W, WB, $W_2B$ | — | 0.242 |
| | 3 | (1) | 75.15 | 16.50 | 5.50 | 2.50 | 0.35 | 0 | 0 | 1000 | 70.5 | 0.773 | W, WB, $W_2B$ | — | 0.233 |
| | 4 | (1) | 75.15 | 16.50 | 5.50 | 2.50 | 0.35 | 0 | 0 | — | — | — | not sintered | — | — |
| | 5 | (1) | 81.70 | 9.00 | 3.00 | 3.00 | 3.00 | 0.30 | 0 | 650 | 70.4 | 0.852 | $Ni_3B$, $W_2Co_{21}B_6$ | — | 0.251 |
| | 6 | (2) | 65.75 | 24.00 | 8.00 | 2.00 | 0.25 | 0 | 0 | 650 | 60.6 | 0.894 | W | — | 0.534 |
| | 7 | (2) | 75.75 | 16.50 | 5.50 | 2.00 | 0.25 | 0 | 0 | 650 | 69.0 | 0.916 | W, WB, $W_2B$ | — | 0.607 |
| | 8 | (2) | 64.00 | 16.50 | 5.50 | 2.00 | 10.00 | 1.00 | 1.00 | 650 | 62.7 | 0.907 | $Co_3B$, WCoB, $WCo_{21}B_6$ | — | 0.322 |

TABLE 1-continued

| | | | | | | | | | | | | | |
|---|---|---|---|---|---|---|---|---|---|---|---|---|---|
| 9 | (2) | 63.75 | 24.00 | 8.00 | 2.00 | 0.25 | 1.00 | 1.00 | 1000 | 60.2 | 0.834 | Ni$_3$B, WCoB, WB, NiAl$_3$ | — | 0.353 |
| 10 | | | | | | | | | | 56.4 | 0.924 | W, WB, W$_2$B | — | 0.056 |

| | | | Electrical | Film | Cutting evaluation | | | | | |
|---|---|---|---|---|---|---|---|---|---|---|
| | | | | | Test 1 | | | Test 2 | | |
| | | Vickers hardness | resistivity [Ω·cm] | thickness [μm] | Film peeling | Amount of wear [μm] | Defects | Film peeling | Amount of wear [μm] | Defects |
| Example | 1 | 3470 | 6.0 × 10$^{-4}$ | 2.8 | Absent | 81 | Absent | | | |
| | 2 | 3482 | 5.9 × 10$^{-4}$ | 2.9 | Absent | 83 | Absent | | | |
| | 3 | 3476 | 5.5 × 10$^{-4}$ | 2.7 | Absent | 82 | Absent | | | |
| | 4 | 3350 | 5.4 × 10$^{-4}$ | 3.0 | Absent | 94 | Absent | | | |
| | 5 | 3175 | 5.2 × 10$^{-4}$ | 2.9 | Absent | 103 | Absent | | | |
| | 6 | 3297 | 2.2 × 10$^{-4}$ | 2.5 | Absent | 85 | Absent | | | |
| | 7 | 3358 | 9.7 × 10$^{-4}$ | 2.6 | Absent | 93 | Absent | | | |
| | 8 | 3457 | 6.5 × 10$^{-3}$ | 2.4 | Absent | 102 | Absent | | | |
| | 9 | 3580 | 8.3 × 10$^{-3}$ | 2.5 | Absent | 106 | Absent | | | |
| | 10 | 3620 | 1.1 × 10$^{-2}$ | 2.5 | Absent | 112 | Absent | | | |
| | 11 | 3550 | 6.5 × 10$^{-3}$ | 3.0 | Absent | 84 | Absent | Absent | 188 | Absent |
| | 12 | 3644 | 6.3 × 10$^{-4}$ | 2.9 | Absent | 92 | Absent | Absent | 176 | Absent |
| | 13 | 3616 | 6.3 × 10$^{-4}$ | 2.9 | Absent | 83 | Absent | Absent | 196 | Absent |
| | 14 | 3602 | 5.9 × 10$^{-4}$ | 3.0 | Absent | 78 | Absent | Absent | 165 | Absent |
| | 15 | 3439 | 5.6 × 10$^{-4}$ | 2.9 | Absent | 87 | Absent | Absent | 237 | Absent |
| Comparative Example | 1 | 2924 | 1.3 × 10$^{-3}$ | 3.1 | Present | — | Present | | | |
| | 2 | 3286 | 5.5 × 0$^{-4}$ | 2.9 | Absent | 121 | Chipping | | | |
| | 3 | 3249 | 5.5 × 10$^{-4}$ | 2.9 | Absent | 117 | Absent | | | |
| | 4 | — | — | — | — | — | — | | | |
| | 5 | 3260 | 6.7 × 10$^{-4}$ | 2.6 | Present | 115 | Absent | | | |
| | 6 | 2947 | 7.3 × 10$^{-3}$ | 2.9 | Absent | 110 | Absent | Present | — | Present |
| | 7 | 3224 | 6.2 × 10$^{-2}$ | 3.0 | Present | — | Present | Present | — | Present |
| | 8 | 2776 | 5.9 × 10$^{-4}$ | 3.0 | Present | 155 | Absent | Present | — | Present |
| | 9 | 2854 | 8.1 × 10$^{-4}$ | 3.0 | Present | — | Present | Present | — | Present |
| | 10 | 2831 | | 2.9 | Present | 165 | Absent | Present | — | Present |

As shown in Table 1, it was confirmed that in the cBN sintered bodies of Examples 1 to 15, a binder phase containing TiB$_2$ and W$_2$Ni$_x$Co$_{(1-x)}$B$_2$ (compound A) was produced. In addition, the Vickers hardness was high, and low electrical resistivity was maintained. Even when a high bias voltage was applied during film formation by the PVD method, a coated tool in which the adhesiveness of the film was high was obtained. This is considered to be because the densification of the sintered body is promoted by the production of the binder phase as described above, and the cBN particles are strongly held without falling off.

It was noted that according to the coated tools according to the Examples as described above, even when high hardness steel on the peripheral surface of which pinholes were provided was cut, the film did not peel, and no tool defects occurred, and excellent wear resistance was obtained.

In contrast to this, in all the cBN sintered bodies of Comparative Examples 1 to 10, the compound A was not included in the binder phase, and the Vickers hardness was poorer than that of the Examples even when the cBN content was equivalent. In addition, in the coated tools according to these Comparative Examples, the tendency of the film to peel easily and a tendency to wear easily were seen.

The invention claimed is:

1. A cubic boron nitride sintered body comprising 60.0 to 90.0% by volume of cubic boron nitride, the remainder being a binder phase, wherein
the binder phase comprises: at least any of a nitride, a boride, and an oxide of Al; at least any of a carbide, a nitride, a carbonitride, and a boride of Ti; and a compound represented by the following formula (1):

$$W_2Ni_xCo_{(1-x)}B_2 (0.40 \leq x < 1) \quad (1), \text{ and}$$

a degree of envelope of perimeter length of cubic boron nitride particles is 0.600 to 0.900.

2. The cubic boron nitride sintered body according to claim 1, wherein in an X-ray diffraction spectrum using CuKα as a radiation source, a ratio IA/IB of diffraction peak intensity IA attributed to a (112) plane of the compound represented by the formula (1) to diffraction peak intensity IB attributed to a (111) plane of cubic boron nitride is in a range of 0.330 to 0.750.

3. The cubic boron nitride sintered body according to claim 1, comprising TiB$_2$ as the boride of Ti, wherein
in the X-ray diffraction spectrum using CuKα as the radiation source, a ratio IC/IB of diffraction peak intensity IC attributed to a (101) plane of TiB$_2$ to the diffraction peak intensity IB attributed to the (111) plane of cubic boron nitride is in a range of 0.140 to 0.750.

4. The cubic boron nitride sintered body according to claim 1, having an electrical resistivity at 25° C. of 1.0×10$^{-5}$ to 5.0×10$^{-2}$ Ω·cm.

5. A manufacturing method of the cubic boron nitride sintered body according to claim 1, comprising the steps of:
mixing and crushing a blend comprising: blended raw materials comprising an Al source, a Ti source, a Ni source, a W source, and a Co source; and a cubic boron nitride powder to obtain a raw material mixture;
heat-treating the raw material mixture at 500 to 800° C. for degassing to obtain a heat-treated powder; and
subjecting the heat-treated powder to pressurization and heating treatment under an inert gas atmosphere at 3.0 GPa or more and 1200 to 1500° C. to obtain a cubic boron nitride sintered body.

6. A tool comprising the cubic boron nitride sintered body according to claim 1 as a constituent material.

7. The tool according to claim 6, for cutting or grinding.

8. The tool according to claim 6, comprising a ceramic coating film on a surface of the cubic boron nitride sintered body.

* * * * *